D. M. SMITH.
Seed Planter.
No. 23,955.  Patented May 10, 1859.
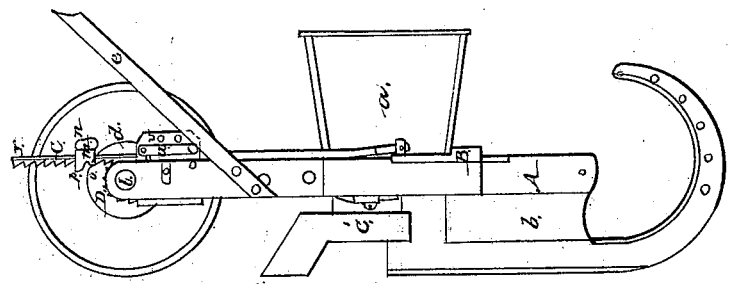
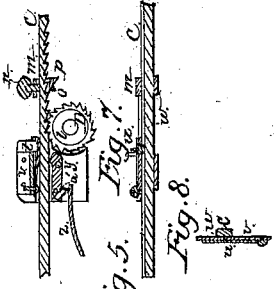
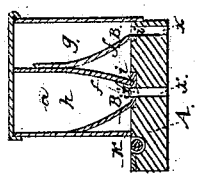
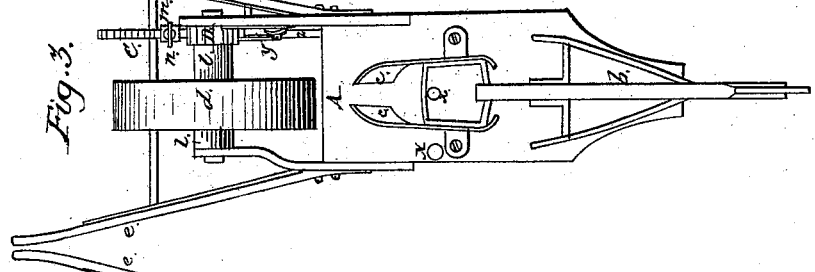
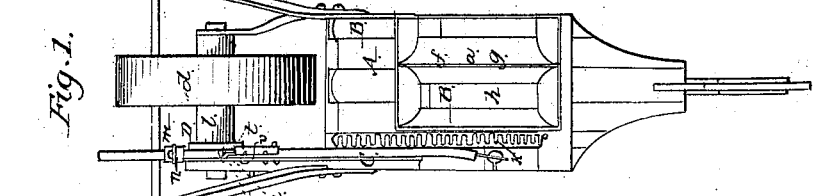
Witnesses:
Lawrence Lyons
Arthur Neill
Inventor:
David M. Smith

UNITED STATES PATENT OFFICE.

DAVID M. SMITH, OF SPRINGFIELD, VERMONT.

IMPROVEMENT IN SEED-PLANTERS.

Specification forming part of Letters Patent No. 23,955, dated May 10, 1859.

*To all whom it may concern:*

Be it known that I, DAVID M. SMITH, of Springfield, in the county of Windsor and State of Vermont, have invented an Improved Seed-Planter; and I do hereby declare that the same is fully described and represented in the following specification and the accompanying drawings, of which—

Figure 1 is a top view, and Fig. 2 a side elevation, of it. Fig. 3 is an under side view of it The nature of my invention consists in a peculiar combination for operating the dropping-slide; also, in the application of what is termed the "rack-lifter," so as to be adjustable on the rack of the dropping-slide mechanism, the object of making it adjustable being to enable the slide to drop seed at such distances on the ground as may be desirable; also, in combining with the rack and apparatus carried by it a means not only of raising or moving the rack out of gear with its moving pinion, but of holding the rack from slipping or being thrown backward, the object being to prepare the rack for causing the machine to plant the first dropping of the seed in the correct position in respect to others of another row previously planted.

In the drawings above mentioned, A denotes the main platform of the machine as supporting a seed-hopper, a, a furrow-opener, b, two coverers, c c, a driving-wheel, d, and a set of handles, e e, the whole being arranged as shown in the drawings.

On the upper surface of the platform A, and adapted thereto so as to be capable of sliding freely in a longitudinal direction within the hopper, is a seed-dropping slide or valve, B. This slide may be formed with a valve, f, for each compartment g or h of the hopper. Each of the valves has a hole, i, made through it, which is to be moved away from and directly over the discharging opening or passage of the hopper, in order either to assist the fall of seed or other matters therefrom or to let seed or other matters out of the hopper, as circumstances may require. A helical spring, k, serves to retract the dropping-slide, such spring being applied at one end to the platform A and at its other end to the dropping-slide.

A toothed rack, C, is jointed or hinged at one end to the dropping-slide, and so as to be capable of being moved vertically on its hinge-pin. This rack engages with a pinion, D, fixed on the shaft l of the driving-wheel d. Furthermore, the rack carries a lifter or detacher, m, which is formed as shown in the drawings, and is adapted to the rack, so as to be capable of being slid longitudinally on it and be fixed in any position on it by a set-screw, n. The lifter is furnished with a tooth, o, and a cam, p, arranged as seen in Fig. 2. Furthermore, the rack has a long groove, r, made in one side of it, as shown in Fig. 2, and also in Figs. 4 and 5, which are side and top views of the rack, there being a vertical passage, s, made out of such groove. The rack is pressed downward toward the pinion by a spring, t. (See Figs. 1 and 6, the latter figure being a longitudinal section of the rack and its spring, together with the parts immediately under the rack.)

A spring-latch, u, is arranged with reference to the rack as shown in Figs. 1, and 2, and particularly in Figs. 7 and 8, of which Fig. 7 is a horizontal section of the latch, its support-piece v, and the rack C, while Fig. 8 is a transverse and vertical section of the same, taken through the cam or projection w of the latch.

While the seed-planter is being moved forward on the ground the pinion, acting on the teeth of the rack, will move such rack so as to cause the dropping-slide to be driven forward in a manner to carry the seed opening or openings of its valve or valves away from the dropping-passage x of the hopper and into such hopper. (See Fig. 9, which is a vertical section of the dropping-opening, the hopper, and the valve or slide.) On the rack-lifter being carried against the pinion the rack will be borne upward out of engagement with the pinion. At the same time the spring-latch will be moved by the rack, so as to cause the projection of the latch to pass into the groove of the rack. As soon as all this has been accomplished the retracting-spring of the hopper-slide will be free to draw the slide back, and will do so, the spring-latch operating in the groove, so as to hold the rack out of engagement with the pinion until the passage s comes directly over the projection of the latch. As soon as this takes place the rack will be forced downward into engagement with the pinion.

By means of the adjustable lifter the movements of the dropping-slide can be regulated so as to cause the seed to be dropped at such intervals on the ground as may be required.

As it may often be desirable to move the machine over the ground without having it drop seed, I apply to the rack an elevator or mechanism by which it may be maintained out of gear with the pinion. This elevator is shown at $y$. It consists of a latch-lever working in a spring, $z$, and having a projection, $a'$, by which it may be operated. The spring and lever are so constructed that the latter, when raised up into its highest position, will be held up by the former.

One division of the hopper and its valve or slide may be used to contain ground plaster, or some material which may be dropped on the ground as the seeds are sown from the other division, the same serving to indicate the places where such seed may have been deposited.

I claim—

1. The combination of the following devices for operating the dropping-slide, viz: the spring $k$, the rack C, the pinion D, the rack-lifter $m$, the groove $r$ of the rack, and the latch $n$, arranged as specified.

2. The application of the rack-lifter $m$ to the rack so as to be adjustable thereon, in manner and for the purpose as set forth.

3. Combining with the rack C and apparatus carried by it the latch-elevator $y$, for moving the rack out of gear with the pinion and holding the rack from slipping or being thrown backward, the object being not only to prepare the rack for causing the machine to plant the first dropping of seed in the right place, but to hold the rack out of gear with the pinion while the machine is being moved over the ground, and it may not be desirable to have it plant seed.

In testimony whereof I have hereunto set my signature.

DAVID M. SMITH.

Witnesses:
R. H. EDDY,
F. P. HALE, Jr.